US010121246B2

(12) United States Patent
Kitamura

(10) Patent No.: US 10,121,246 B2
(45) Date of Patent: Nov. 6, 2018

(54) MEASUREMENT APPARATUS THAT OBTAINS INFORMATION OF A SHAPE OF A SURFACE USING A CORRECTED IMAGE AND MEASUREMENT METHOD

(71) Applicant: CANON KABUSHIKI KAISHA, Tokyo (JP)

(72) Inventor: Tsuyoshi Kitamura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 86 days.

(21) Appl. No.: 15/055,900

(22) Filed: Feb. 29, 2016

(65) Prior Publication Data
US 2016/0260217 A1    Sep. 8, 2016

(30) Foreign Application Priority Data
Mar. 4, 2015  (JP) ................. 2015-042977

(51) Int. Cl.
*H04N 9/04* (2006.01)
*G06T 7/00* (2017.01)
(Continued)

(52) U.S. Cl.
CPC ........ *G06T 7/0018* (2013.01); *G01B 11/2513* (2013.01); *G06T 5/50* (2013.01);
(Continued)

(58) Field of Classification Search
CPC ...... G01B 11/2513; G06T 2207/10024; G06T 2207/10152; G06T 5/50; G06T 7/0018; G06T 7/586; H04N 5/2256; H04N 9/04
(Continued)

(56) References Cited

U.S. PATENT DOCUMENTS 5,187,572 A * 2/1993 Nakamura ......... A61B 1/00009
348/164
5,900,863 A * 5/1999 Numazaki ............... G06F 3/011
345/156
(Continued)

FOREIGN PATENT DOCUMENTS

JP        3289505 A    12/1991
JP        3884321 B2    2/2007

OTHER PUBLICATIONS

Ahmed et al, Shape from shading from hybrid surfaces, 2007.*
Ahmed et al, Shape from shading for hybrid surfaces. (Year: 2007).*

*Primary Examiner* — Shan E Elahi
(74) *Attorney, Agent, or Firm* — Rossi, Kimms & McDowell LLP

(57) ABSTRACT

A measurement apparatus includes: a first illumination unit configured to illuminate the surface with first light having a first wavelength having a light intensity distribution in a pattern shape; a second illumination unit configured to illuminate, with second light having a second wavelength, a region wider than an illumination region illuminated with the first light; an image sensing unit configured to sense an image of the surface; and a processor. The processor is configured to obtain a first image of the first wavelength and a second image of the second wavelength of the surface unit while illuminating the surface by using the first and second illumination units, correct the first image based on the second image, and obtain information of a shape of the surface by using the corrected first image.

21 Claims, 8 Drawing Sheets

(51) Int. Cl.
  *G01B 11/25* (2006.01)
  *G06T 5/50* (2006.01)
  *G06T 7/586* (2017.01)
  *H04N 5/225* (2006.01)

(52) U.S. Cl.
  CPC ............... *G06T 7/586* (2017.01); *H04N 9/04* (2013.01); *G06T 2207/10024* (2013.01); *G06T 2207/10152* (2013.01); *H04N 5/2256* (2013.01)

(58) Field of Classification Search
  USPC .......................................................... 348/136
  See application file for complete search history.

(56) References Cited

U.S. PATENT DOCUMENTS

| | | | | |
|---|---|---|---|---|
| 6,970,246 B2* | 11/2005 | Hansen | ................ | G01N 21/645 250/458.1 |
| 7,092,563 B2 | 8/2006 | Shiratani | | |
| 7,457,441 B2* | 11/2008 | Hartlove | ............ | G06K 9/00369 374/121 |
| 7,847,937 B1* | 12/2010 | Bevis | ................ | G01N 21/1717 250/216 |
| 9,739,605 B2* | 8/2017 | Jeong | ................ | G01B 11/2531 |
| 2009/0153926 A1* | 6/2009 | Wiltshire | ................ | G03H 1/22 359/2 |
| 2010/0074546 A1* | 3/2010 | Ishigami | ................ | G06K 9/38 382/251 |
| 2010/0142780 A1* | 6/2010 | Yasuno | ................ | A61B 3/102 382/131 |
| 2011/0282673 A1* | 11/2011 | Di Profio | ................ | G06F 3/017 704/275 |
| 2013/0120449 A1* | 5/2013 | Ihara | ................ | G06F 11/0727 345/633 |
| 2013/0241835 A1* | 9/2013 | Lee | ................ | G06F 3/03543 345/166 |
| 2013/0250144 A1* | 9/2013 | Takayama | ............... | H04N 5/265 348/239 |
| 2013/0324830 A1* | 12/2013 | Bernal | ................ | H04N 7/181 600/407 |
| 2013/0329073 A1* | 12/2013 | Majewicz | ............... | H04N 1/387 348/222.1 |
| 2014/0043309 A1* | 2/2014 | Go | ................ | G01B 11/22 345/207 |
| 2014/0236996 A1* | 8/2014 | Masuko | ................ | G06F 3/01 707/776 |
| 2015/0062000 A1* | 3/2015 | Saito | ................ | G02B 27/017 345/156 |
| 2015/0070273 A1* | 3/2015 | He | ................ | G06F 3/013 345/156 |
| 2015/0234471 A1* | 8/2015 | Niinuma | ................ | G06F 3/017 345/156 |
| 2015/0269735 A1* | 9/2015 | Tateno | ................ | G06T 7/0046 382/153 |
| 2016/0041619 A1* | 2/2016 | Ishiwata | ................ | G06F 1/163 715/857 |

* cited by examiner

MEASUREMENT APPARATUS THAT OBTAINS INFORMATION OF A SHAPE OF A SURFACE USING A CORRECTED IMAGE AND MEASUREMENT METHOD

BACKGROUND OF THE INVENTION

Field of the Invention

The present invention relates to a measurement apparatus and measurement method which measure the shape of a surface to be measured.

Description of the Related Art

An optical measurement apparatus is one of techniques of evaluating the shape of a surface to be measured. Optical measurement apparatuses based on various types of schemes are available. A scheme called a pattern projection method is one of these schemes. This scheme is designed to measure the shape of a surface to be measured (target object) by performing image sensing by projecting a predetermined projection pattern on the surface and calculating distance information at each pixel position from the principle of triangulation. Pattern projection methods are further classified into a plurality of schemes according to pattern projection methods, which include a multi-shot scheme of projecting a plurality of patterns, such as a phase shift method or a space encoding method, and a single-shot scheme of projecting a pattern once. When measuring a surface to be measured which moves at high speed, it is difficult to perform the measurement by using the multi-shot scheme, and hence the single-shot scheme is used for the measurement.

When using the single-shot scheme, various contrivances are employed for pattern light to specify that each pixel of a sensed image indicates the information of specific coordinates of the pattern light. For example, there are available a dot line scheme designed to provide dots, each of which is identifiable, on stripe pattern lines, a line width modulation scheme designed to change a line width for identifying each line, a random dot scheme designed to project randomly arranged dots, and the like. These measurement methods are designed to detect dots, lines, and the like and reconstruct coordinate information based on spatial distribution information of brightnesses obtained from a sensed image. However, spatial distribution information of brightness levels is data including the influences of a reflectance distribution on a surface to be measured, the bias of the illuminance distribution of a light source, background light, and the like. These influences may cause errors in the detection of dots and lines or may lead to inability to perform detection itself. As a consequence, the accuracy of measured shape information deteriorates. When considering a measurement apparatus capable of coping with a wide surface to be measured, it is necessary to minimize the influence of a reflectance distribution on the surface to be measured.

With regard to the above problem, a technique according to Japanese Patent Laid-Open No. 3-289505 obtains not only an image (pattern image) upon irradiation with pattern light but also an image (uniform illumination image) upon irradiation with uniform illumination light. Using the data of a uniform illumination image as correction data makes it possible to remove, from a pattern image, a distortion caused by a variation in a reflectance distribution on a surface to be measured or the bias of the illuminance distribution of a light source. Since the coordinate information of each line is accurately detected from the corrected pattern image, the shape and position of the surface to be measured can be accurately measured. A technique according to Japanese Patent No. 3884321 is directed to a color pattern projection measurement method using a pattern having a plurality of color components. In this case, since a color distribution on the surface to be measured varies in reflectance with respect to light having various wavelengths. This, in particular, makes it difficult to reconstruct coordinate information on a deep color surface to be measured. In contrast to this, the shape information of a surface to be measured can be obtained independently of its color distribution by correcting a pattern image using an image obtained by irradiating a surface to be measured with light from a light source not via a pattern forming apparatus.

According to Japanese Patent Laid-Open No. 3-289505, a pattern image and a uniform illumination image are sensed from light emitted from the same light source, and a liquid crystal shutter switches between using and not using a pattern at the time of obtaining the two images. For this reason, the two images are not obtained at the same time. According to Japanese Patent No. 3884321 as well, a transmission type liquid crystal apparatus switches between using and not using a pattern, and the two images are obtained at different timings. From the viewpoint of correction, it is necessary to match image sensing conditions for the two images as much as possible. It is therefore taken for granted that measurement is performed at the same wavelength by using light from the same light source. In this case, it is impossible to obtain two images at the same timing.

On the other hand, when considering the application of a shape measurement apparatus, the relative positional relationship between a surface to be measured and an image sensor is not always constant. When considering a case of using, for example, a measurement apparatus as a machine vision, there can be situation in which a surface to be measured moves on a belt conveyor, and the shape information of the moving surface needs to be obtained in real time. In addition, when it is necessary to grip a target object, it is necessary to calculate, in real time, the relative positions of the object and a grip unit which moves to grip, in consideration of throughput. In the following description, such measurement which requires to grasp the shape information of a surface to be measured in real time is written as movement measurement.

The conventional techniques disclosed in Japanese Patent Laid-Open No. 3-289505 and Japanese Patent No. 3884321 are designed to obtain a pattern image and an image for correcting it at different timings. For this reason, under the environment of movement measurement in which measurement is performed while a target object or an image sensing unit is moving, two images are sensed in different visual fields. According to the related art, therefore, it is difficult to accurately correct a pattern image, or it is necessary to correct the influence of a change in visual field accompanying movement on the image.

SUMMARY OF THE INVENTION

The present invention provides a measurement apparatus which accurately measures the shape of a surface to be measured.

The present invention in one aspect provides a measurement apparatus of measuring a shape of a surface to be measured, the apparatus comprising: a first illumination unit configured to illuminate the surface with first light having a first wavelength having a light intensity distribution in a pattern shape; a second illumination unit configured to illuminate, with second light having a second wavelength different from the first wavelength, a region of the surface which is wider than an illumination region illuminated with the first light; an image sensing unit configured to sense an image of the surface; and a processor configured to obtain information of a shape of the surface by processing the image of the surface output from the image sensing unit, wherein the processor obtains a first image of the first wavelength and a second image of the second wavelength of the surface sensed by the image sensing unit while illuminating the surface by using the first illumination unit and the second illumination unit, corrects the first image based on the second image, and obtains information of a shape of the surface by using the corrected first image.

Further features of the present invention will become apparent from the following description of exemplary embodiments with reference to the attached drawings.

DESCRIPTION OF THE EMBODIMENTS

The present invention has been made in consideration of the above problem, and is configured to accurately measure the shape of a surface to be measured by removing, in real time, the influence of a measurement error caused by a reflectance distribution on the surface whose position relative to a measurement apparatus changes.

First Embodiment

Figure 1:
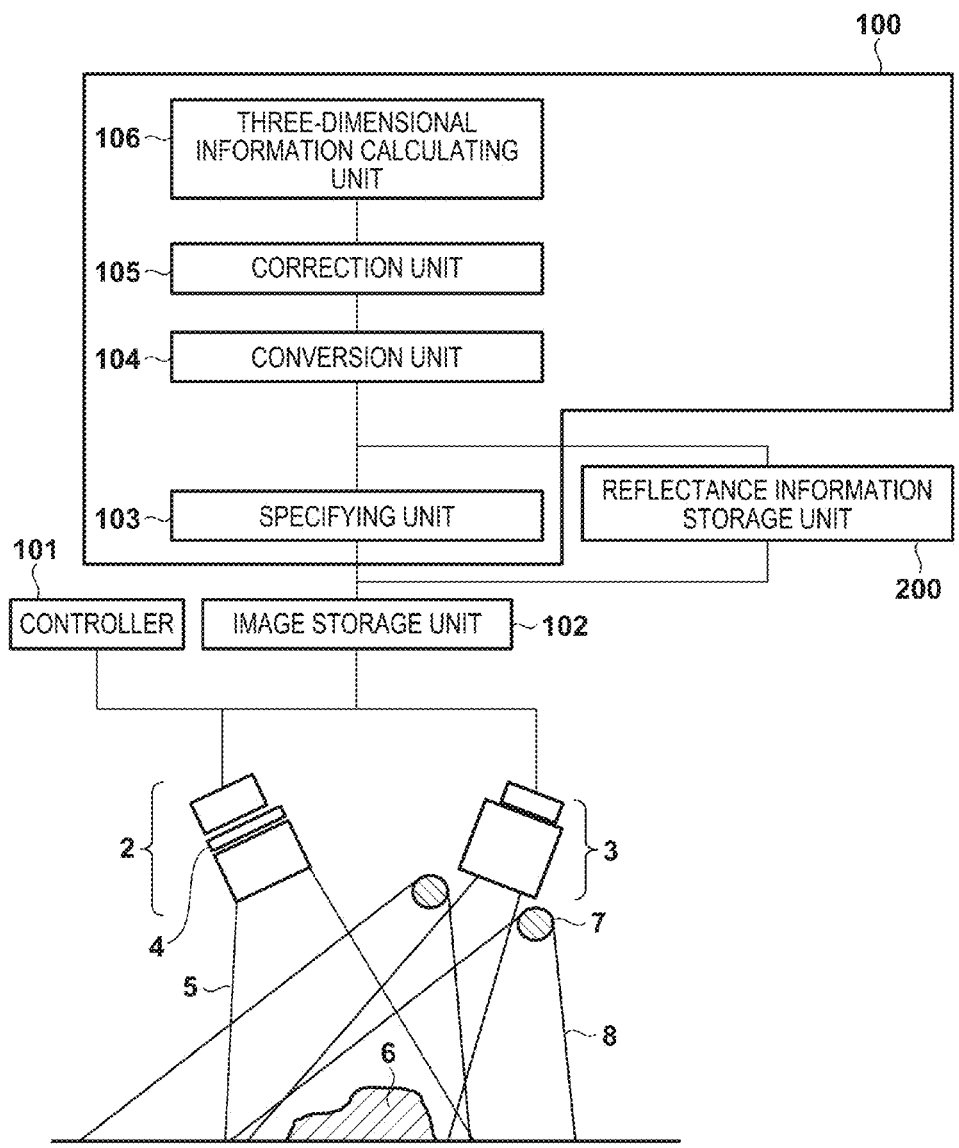
FIG. 1 is a view showing a measurement apparatus according to the first embodiment.

FIG. 1 shows a measurement apparatus which measures, for example, the three-dimensional shape of a surface to be measured according to the first embodiment. This measurement apparatus, like a conventional measurement apparatus, includes a first illumination unit 2 which illuminates a surface 6 to be measured (target object) with first light having a first wavelength with a slit shape and an image sensing unit 3 which senses an image of the surface 6. The first illumination unit 2 includes a light source which emits light having the first wavelength, a generation unit 4 which generates first light (pattern light) having a light intensity distribution with a pattern shape, and a projection optical system such as a lens. The image sensing unit 3 includes a CCD or CMOS (not shown) and an imaging optical system such as a lens. A controller 101 controls the first illumination unit 2 for the first light and the image sensing unit 3.

The first illumination unit 2 illuminates the surface 6 with first light 5. The pattern shape of the first light 5 varies depending on the measurement scheme used. The pattern shape of the first light 5 is formed from, for example, dots or slits (lines). When the pattern shape of the first light 5 is formed from dots, the first light 5 may be a single dot or a dot line pattern obtained by arranging a plurality of dots whose coordinates are identifiable on each line of a line pattern. When the pattern shape of the first light 5 is formed from lines, the first light 5 may be slit light formed from one line or a line width modulated pattern obtained by changing the width of each line to identify the line. The image sensing unit 3 senses an image of the surface 6 illuminated with the first light 5 having the first wavelength. An image storage unit 102 stores an image of the first wavelength (first image) of the surface 6 output from the image sensing unit 3. The image obtaining method and the apparatus arrangement required for the method according to the first embodiment are the same as those of a conventional measurement apparatus.

On the other hand, the measurement apparatus according to the first embodiment includes a second illumination unit 7 which illuminates a region wider than an illumination region illuminated with the first light, as compared with the conventional measurement apparatus arrangement. Second light 8 emitted from the second illumination unit 7 is light having the second wavelength different from the first wavelength. In this embodiment, let λ1 be the wavelength of the first light 5, and λ2 be the wavelength of the second light 8. In the embodiment, illumination by the first light 5 from the first illumination unit 2 is provided at the same time as illumination by the second light 8 from the second illumination unit 7. However, the illumination timings of the two illumination operations need not be exactly the same and may almost the same. Therefore, the two illumination operations may be two intermittent illumination operations provided at slightly different illumination timings.

The image sensing unit 3 obtains the second image of the surface 6 which has the second wavelength by sensing an image of the surface 6 illuminated with the second light 8 at the same timing as that at which the first image of the first wavelength is obtained. In this embodiment, the first and second images are obtained at the same timing. However, the two images need not be obtained at exactly the same timing, and may be obtained almost the same timing. The image sensing unit 3 includes a wavelength separation mechanism such as a color filter (wavelength separation filter), and can obtain the first image of the first wavelength and the second image of the second wavelength upon separating them at the same time. The image storage unit 102 stores the first and second images sensed at the same time.

An apparatus arrangement and method which correct the first image by using the second image will be described below. The first and second images stored in the image storage unit 102 are sent to a specifying unit 103. The specifying unit 103 specifies a corrected region in which the reflectance distribution should be corrected by using the second image. A method of specifying a corrected region will be described based on FIG. 2. First of all, edge detection is performed for a second image 300 to extract a boundary line of a brightness change of image information. A boundary line forms a region having almost the same reflectance except for a case in which the surface reflectance of the surface 6 continuously changes. Causes of a brightness change include a change 303 in surface reflectance originating from the surface properties of a print 301 or the like and a reflectance change 304 depending on the angle of the surface, which occurs across a ridge line (edge) 302 of the surface 6. For this reason, only a region having a specific reflectance is extracted based on the former cause influencing a measurement value.

Figure 2:
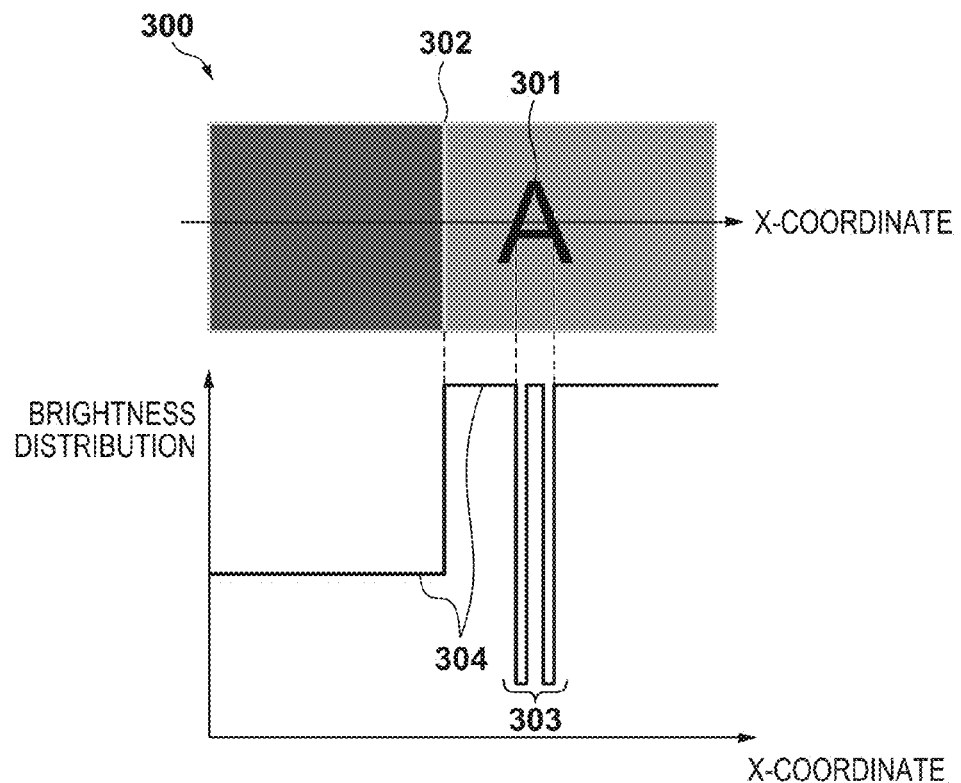
FIG. 2 is a view showing how a reflectance distribution is specified.

One of the extraction techniques can use shape characteristics concerning a specific surface property region such as a print region. More specifically, referring to the case shown in FIG. 2, a reflectance information storage unit (storage unit) 200 in a processor 100 stores the shape information of print A in advance, and the specifying unit 103 performs matching with the brightness distribution information of the second image 300 to specify a region in which a print exists. Alternatively, if a region of the print 301 or the like is smaller in dimension than the surface 6, it is possible to determine a corrected region from the area of the region. For the sake of descriptive convenience, FIG. 2 shows the region of the print 301 in a large size relative to the underlying material. In practice, however, the area of the print 301 is greatly smaller than that of the underlying material of the surface 6 in most cases. In such a situation, it is possible to discriminate, from only the dimensional information of a region delimited by a boundary, whether the region indicates a surface property region such as a print region. Assume that there is summary information about the position and posture of the surface 6. In this case, a region in which a change in surface property can occur may be specified in advance based on the summary information about the position and the posture, and the respective regions may be classified into high-reflectance regions and low-reflectance regions according to only the magnitude of reflectance in the region.

Figure 3:
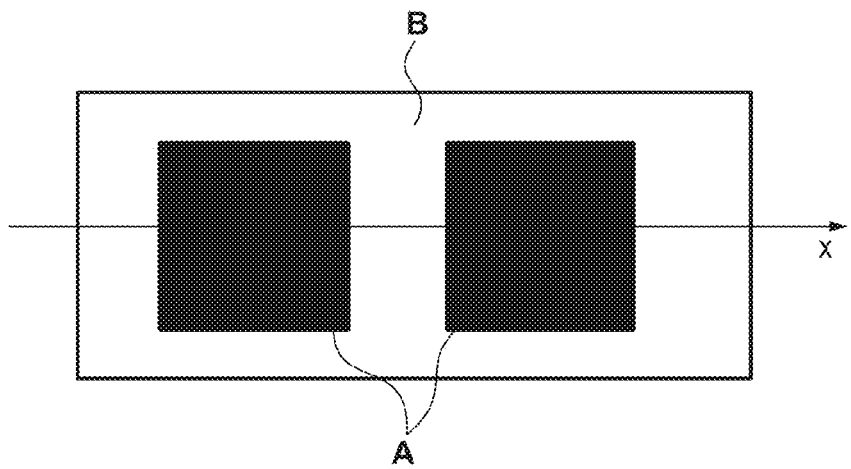
FIG. 3 is a view showing an example of the state of a surface to be measured.
Figure 4:
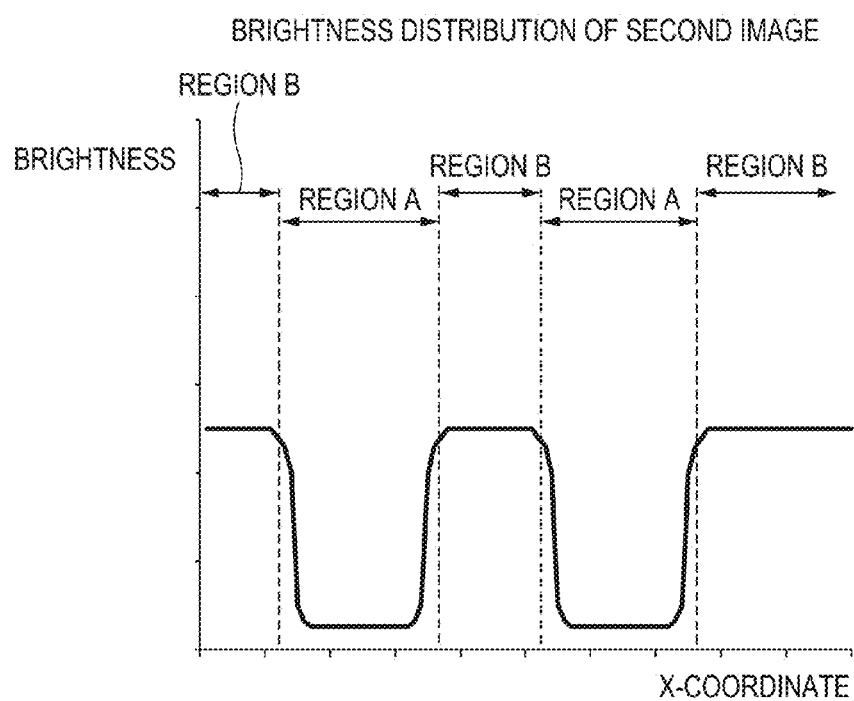
FIG. 4 is a graph showing an example of the brightness distribution of a uniform illumination image.

After a corrected region in which the reflectance distribution should be corrected is specified, the first and second images are sent to a correction unit 105. The correction unit 105 corrects a reflectance based on a wavelength difference by using reflectance information stored in advance in a reflectance information storage unit 200. Subsequent correction will be described by exemplifying a case in which two types of surface properties with different reflectances are distributed on the surface 6 as shown in FIG. 3. Assume that, as shown in FIG. 3, a region in which one surface property exists will be referred to as region A, and a region in which the other surface property exists will be referred to as region B. FIG. 4 shows the second image obtained by irradiating these regions with the second light having the wavelength $\lambda 2$. The specifying unit 103 has already specified regions of this image in which regions A and regions B exist through the above reflectance distribution specifying process.

Figure 5:
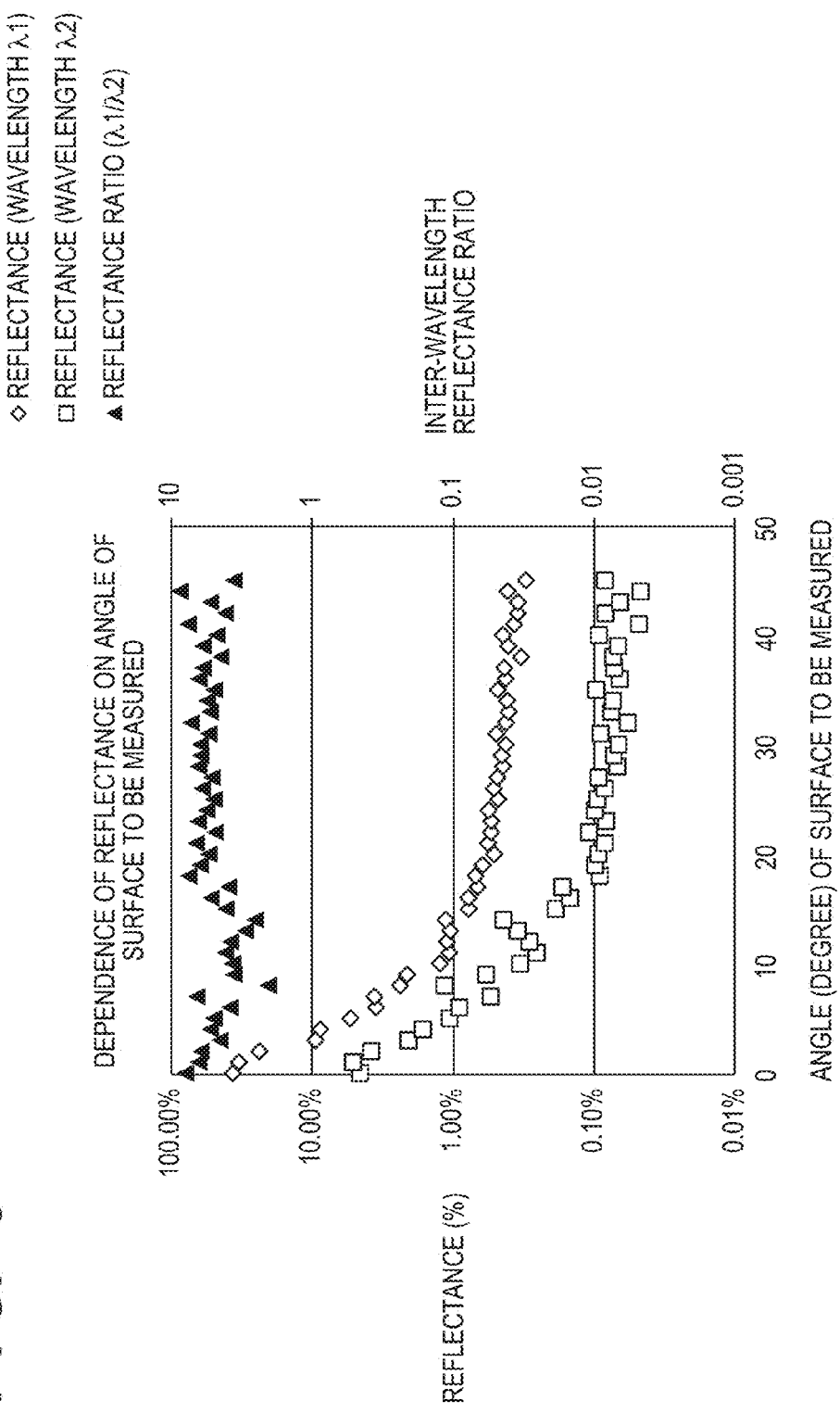
FIG. 5 is a graph showing the dependence of reflectance on the angle of a surface to be measured.

The brightness distribution of the second image measured with the second light having the wavelength $\lambda 2$ shown in FIG. 4 is multiplied by the inter-wavelength reflectance ratio between the reflectance with respect to the wavelength $\lambda 1$ and the reflectance with respect to the wavelength $\lambda 2$ based on the respective surface properties, which are stored in the reflectance information storage unit 200, so as to be converted into the brightness distribution of the second image measured with the wavelength $\lambda 1$. Although a reflectance greatly depends on the angle of a surface to be measured, the dependence of an inter-wavelength reflectance ratio on the angle of the surface is low. FIG. 5 shows the results obtained by measuring reflectances with light having the wavelength $\lambda 1$ and light having the wavelength $\lambda 2$ while changing the angle of a surface to be measured which uses a given homogeneous material. Although the reflectances at the two wavelengths greatly change depending on the angle of the surface to be measured, the dependence of inter-wavelength reflectance ratio on the angle of the surface to be measured is low. It is therefore possible to perform the above conversion with a certain degree of correctness even while the angle of the surface to be measured is unknown.

Figure 6:
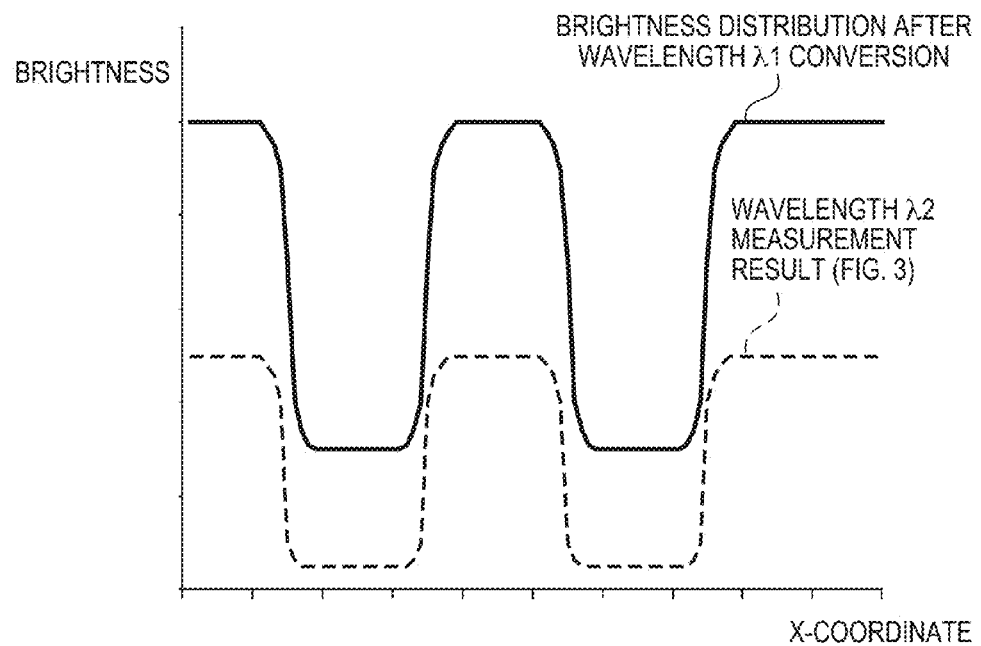
FIG. 6 is a graph showing an example of the brightness distribution of a uniform illumination image having undergone wavelength conversion.

FIG. 6 shows the results obtained by causing a conversion unit 104 to convert the second image into an image of the first wavelength. The brightness distribution of the second image after the conversion corresponds to an image obtained by illuminating and sensing a wide illumination region of the surface 6 with light having the wavelength $\lambda 1$. The first image formed from the first light having the wavelength $\lambda 1$ and the second image converted into the wavelength $\lambda 1$ are sent to the correction unit 105. The correction unit 105 corrects the reflectance distribution of the first image based on the second image converted into the first wavelength.

Figure 7:
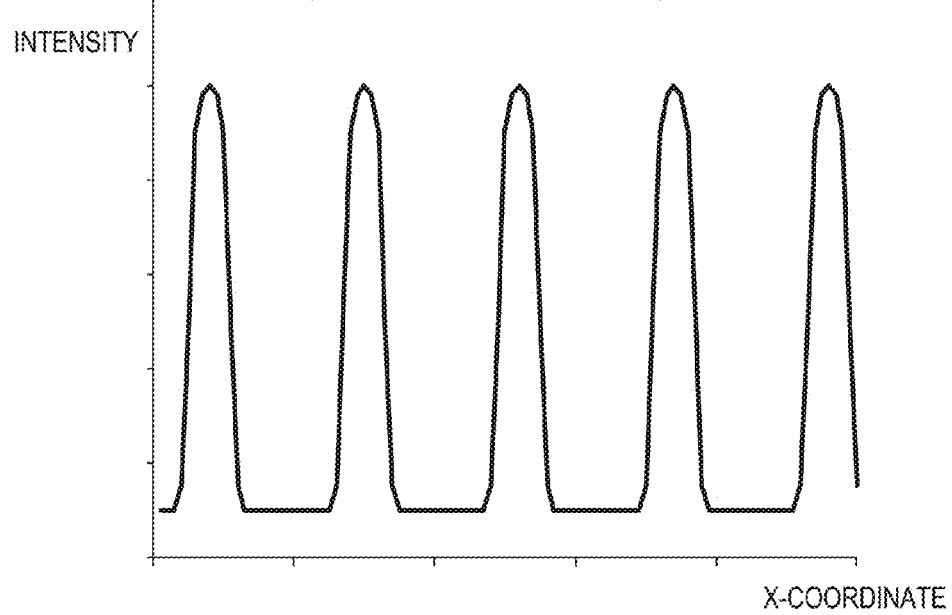
FIG. 7 is a graph showing an example of the intensity distribution of pattern light.
Figure 8:
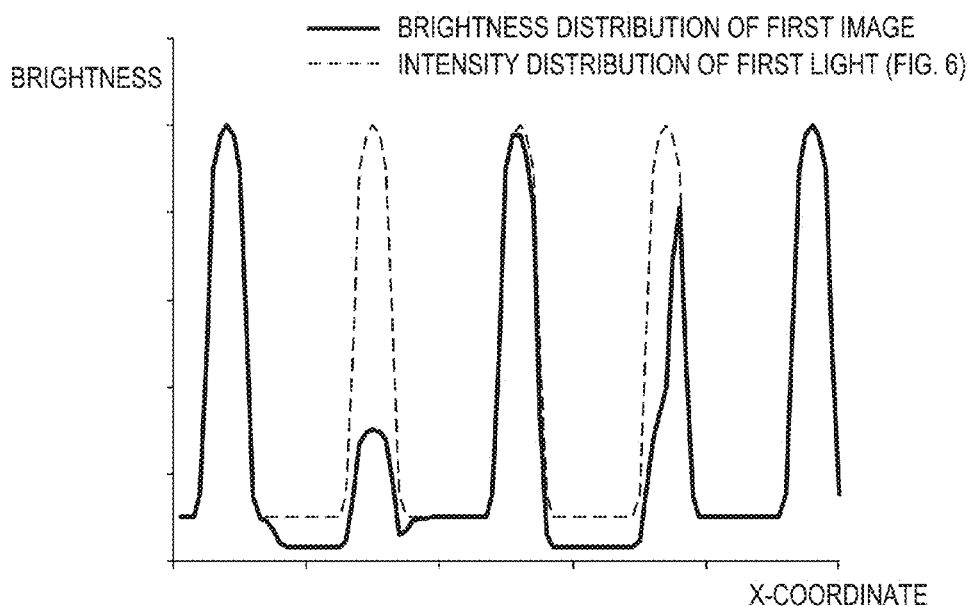
FIG. 8 is a graph showing an example of the brightness distribution of a pattern image.
Figure 9:
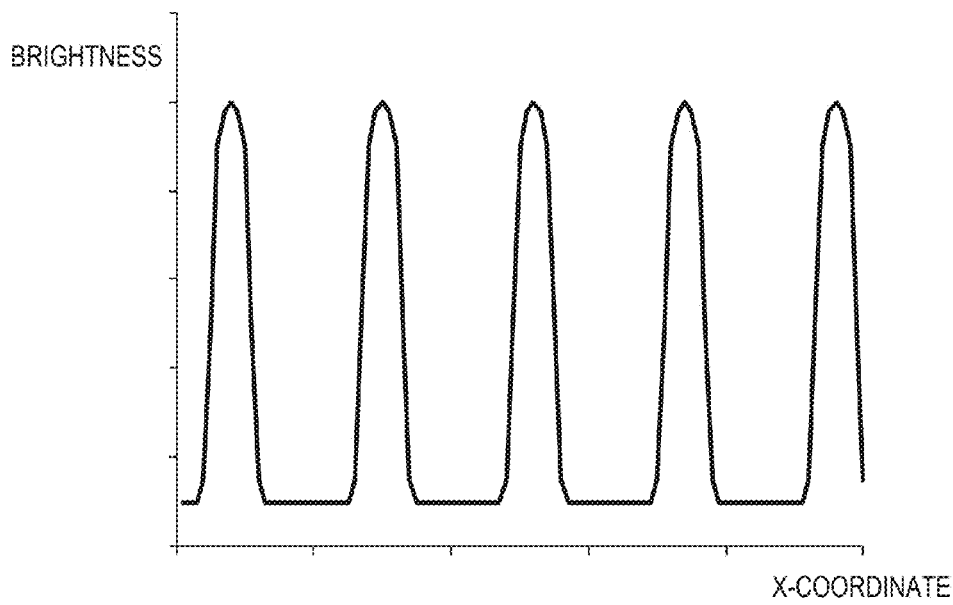
FIG. 9 is a graph showing an example of the brightness distribution of a corrected pattern image.

Consider the intensity distribution of the first light 5 shown in FIG. 7. The solid line in FIG. 8 indicates an example of the brightness distribution of the first image obtained by projecting the first light 5. Referring to FIG. 8, the dotted line represents the intensity distribution of the first light shown in FIG. 7. Obviously, the brightness distribution of the first light is distorted by the influence of the reflectance distribution on the surface 6. Pattern edge coordinates calculated from the distorted pattern brightness distribution contain an error, and hence three-dimensional shape information calculated from the pattern edge coordinates also contains an error. The correction unit 105 performs correction by dividing the brightness distribution of the first image in FIG. 7 by the second image having undergone wavelength conversion in FIG. 6. FIG. 9 shows the brightness distribution of the corrected first image. Obviously, the distortion caused by the influence of the reflectance distribution is removed.

As described above, in the first embodiment, the first image stored in the image storage unit 102 is corrected by using the first image stored in the image storage unit 102 and the reflectance information of the surface 6 stored in the reflectance information storage unit 200. For the sake of simplicity, the correction of the first image has been described in consideration of the one-dimensional brightness distribution. However, the above correction method and its effect remain the same even in consideration of a two-dimensional brightness distribution.

A three-dimensional information calculating unit 106 calculates a three-dimensional shape by using the brightness distribution of the corrected first image. The influence of the reflectance distribution on the surface 6 has been removed from the three-dimensional shape calculated in this case, and hence high-accuracy information is provided. In the above apparatus arrangement and calculation process, correction is performed by using the second image sensed at the same timing at which the first image is sensed. This makes it possible to perform real-time correction and calculate a high-accuracy three-dimensional shape even in a situation in which a target object like that described above moves or the relative distance to, for example, a portion which grips a target object changes.

Second Embodiment

Figure 10:
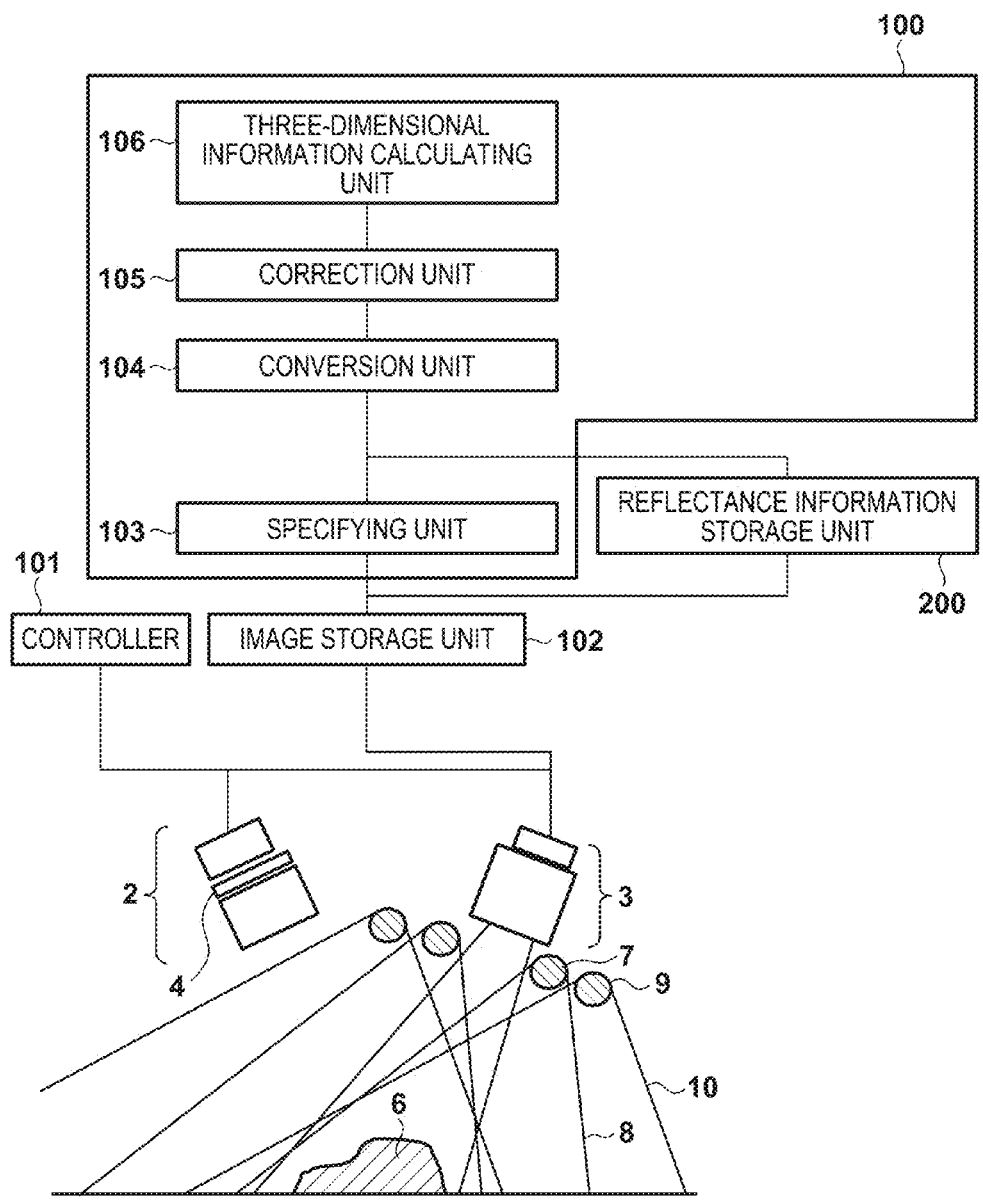
FIG. 10 is a view showing a measurement apparatus according to the second embodiment.

The second embodiment will be described next. An apparatus arrangement and method used for the calculation of a three-dimensional shape and the correction of the first image according to the second embodiment are the same as those used in the first embodiment. In the second embodiment, however, no reflectance information is input to a reflectance information storage unit 200 in advance. Instead of this, the second embodiment includes an apparatus arrangement for obtaining reflectance information. In addition to the apparatus arrangement described in the first embodiment, a measurement apparatus according to the second embodiment shown in FIG. 10 includes another illumination unit (third illumination unit) 9 which illuminates an illumination region having a wide surface 6 to be measured with light having a wavelength $\lambda 1$. The third illumination unit 9 emits third light 10 having the same wavelength $\lambda 1$ as that of first light 5. Note that an example of the form of the third illumination unit 9 includes, for example, annular illumination.

In the second embodiment, the reflectance information of the surface 6 is obtained by measurement before the first image is obtained. More specifically, the surface 6 is illuminated by the third illumination unit 9 which emits the third light 10 having the wavelength $\lambda 1$ and a second illumination unit 7 which emits second light 8 having a wavelength $\lambda 2$, and an image of the surface 6 is then sensed by the image sensing unit 3. An image storage unit 102 stores the second image of the second wavelength and the third image of the first wavelength. An inter-wavelength reflectance ratio in each region is derived from these images. The reflectance information storage unit 200 stores the derived information. Thereafter, the third illumination unit 9 is turned off. The light source of first illumination unit 2 is then turned on to emit the first light 5 so as to irradiate the surface 6 with the first light 5 having the wavelength $\lambda 1$ and the second light 8 having the wavelength $\lambda 2$ emitted from the second illumination unit 7 at the same timing.

The subsequent image sensing, image correction, and three-dimensional shape calculation method are the same as those in the first embodiment except that information measured and stored as inter-wavelength reflectance ratio information in advance by the above arrangement and process is used. In the second embodiment, the direction of the surface 6 with respect to the imaging plane at the timing at which inter-wavelength reflectance ratio information is obtained differs from that at the timing of actual measurement. That is, correction is performed based on reflectance data measured at the angle of the surface to be measured which differs from that at the time at which the first image, based on which a three-dimensional shape is calculated, is obtained. However, as shown in FIG. 5, since the dependence of an inter-wavelength reflectance ratio on the angle of a surface to be measured is relatively low, the influence of a difference in the angle of a surface to be measured between the above correction methods is small.

The three-dimensional shape information obtained through the above apparatus arrangement and process is high-accuracy information from which the influence of a reflectance distribution on the surface 6 has been sufficiently removed. In addition, since the first image and the second image for correction are obtained at the same timing, it is possible to perform real-time correction and cope with measurement even in a case in which the relative position of the surface 6 changes at high speed.

Third Embodiment

Figure 11:
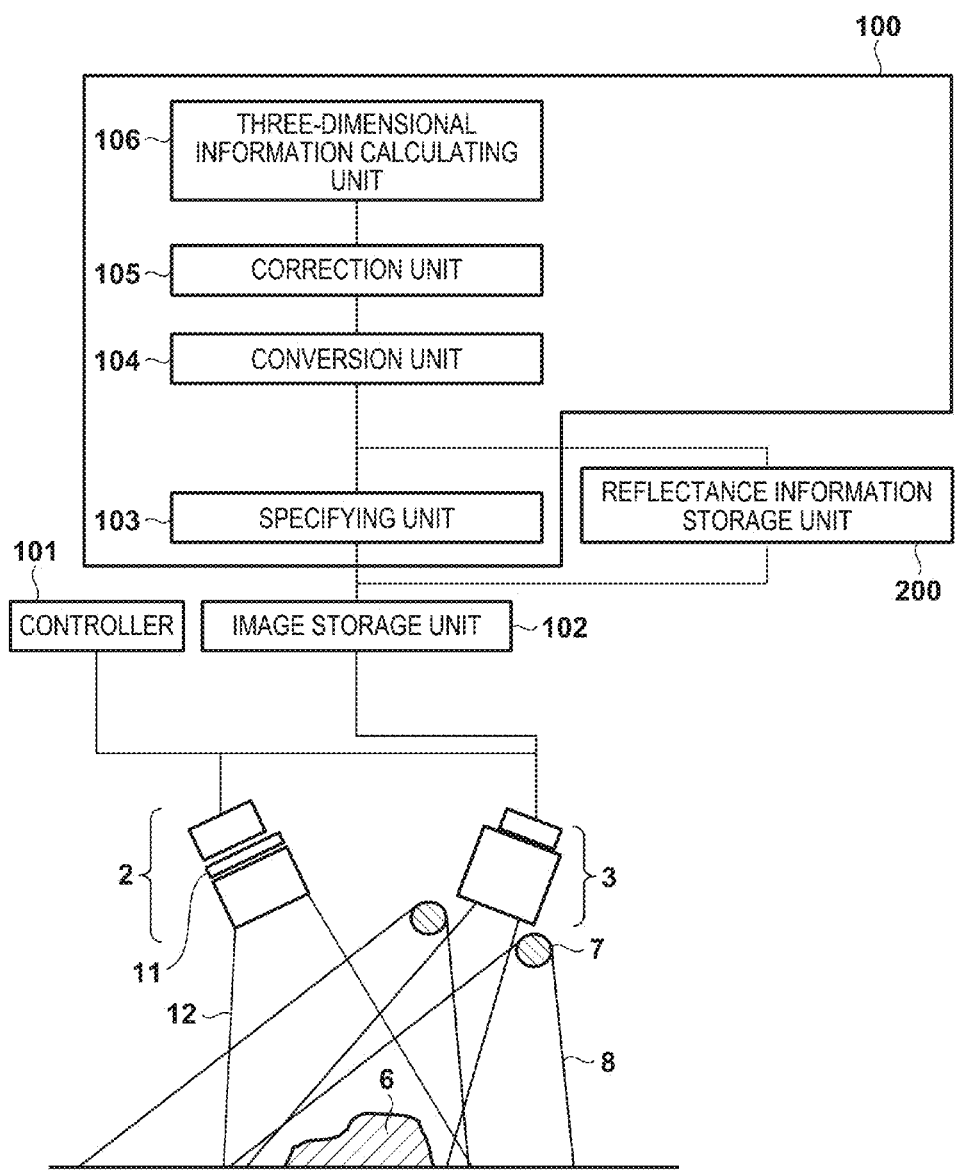
FIG. 11 is a view showing a measurement apparatus according to the third embodiment.

The third embodiment will be described next. Like the second embodiment, the third embodiment has an apparatus arrangement and process for obtaining the reflectance information of a surface 6 to be measured, but differs from the second embodiment in a method of obtaining reflectance information. A measurement apparatus according to the third embodiment shown in FIG. 11 includes a switching mechanism 11 which switches a generation unit 4 in the apparatus arrangement described in the first embodiment between a position on an optical path and a position outside the optical path. The switching mechanism 11 is, for example, a liquid crystal shutter.

In the third embodiment, a second illumination unit 7 emits second light 8 having a wavelength $\lambda 2$ at the same time that a light source emits third light 12 having a wavelength $\lambda 1$ under the control of the switching mechanism 11. This embodiment is configured to irradiate a wide illumination region of the surface 6 with light beams having two wavelengths at the same time and cause an image sensing unit 3 to perform image sensing. An image storage unit 102 stores the second image of the wavelength $\lambda 2$ and the third image of the wavelength $\lambda 1$. An inter-wavelength reflectance ratio in each region is derived from these images, and the obtained information is stored in a reflectance information storage unit 200.

Subsequently, under the control of the switching mechanism 11, the light source emits the third light 12 having the wavelength $\lambda 1$, and the second illumination unit 7 emits the second light 8 having the wavelength $\lambda 2$ at the same time, thereby irradiating the surface 6 with these two light beams. The subsequent image sensing, image correction, and three-dimensional shape calculation method are the same as those in the first and second embodiments except that information measured and stored as inter-wavelength reflectance ratio information in advance by the above arrangement and process is used. The third embodiment is also the same as the first and second embodiments in that the influence of a reflectance distribution is removed with sufficient accuracy in correction by using an inter-wavelength reflectance ratio with low dependence on the angle of a surface to be measured, and the first image and the second image for correction are obtained at the same timing to implement real-time correction.

There is available a measurement method of obtaining the position and posture of the surface 6 by fitting a model of the surface 6, which is prepared in advance, to a two-dimensional shape obtained from the second image and a three-dimensional shape obtained from the first image. It is possible to implement a position/posture measurement method of obtaining the second image for obtaining a two-dimensional shape and, at the same time, calculating a three-dimensional shape by correcting the first image based on the second image, by applying the present invention to this measurement method. In this case, since it is possible to obtain the second image for correction by the apparatus arrangement required to obtain two-dimensional shape information as well as calculating a position and a posture based on high-accuracy three-dimensional shape information, there is no need to, for example, add another arrangement.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-042977, filed Mar. 4, 2015, which is hereby incorporated by reference herein in its entirety.

What is claimed is:

1. A measurement apparatus that obtains information of a shape of a surface to be measured, the apparatus comprising:
   a first illumination unit configured to illuminate the surface with first light having a first wavelength having a light intensity distribution in a pattern shape;
   a second illumination unit configured to illuminate the surface with second light having a second wavelength different from the first wavelength;
   an image sensing unit configured to sense an image of the surface; and
   a processor configured to obtain information of the shape of the surface by processing the image of the surface output from the image sensing unit,
   wherein the processor obtains a first image of the first wavelength and a second image of the second wavelength of the surface sensed by the image sensing unit while illuminating the surface by using the first illumination unit and the second illumination unit, corrects the first image based on the second image, and obtains the information of the shape of the surface by using the corrected first image.

2. The apparatus according to claim 1, wherein the image sensing unit includes a wavelength separation filter, and separates and obtains the first image and the second image by sensing an image of the surface illuminated by the first illumination unit and the second illumination unit.

3. The apparatus according to claim 1, wherein the processor corrects the first image by using the second image and a ratio between two reflectance distributions on the surface with respect to light having the first wavelength and light having the second wavelength.

4. The apparatus according to claim 3, wherein the processor specifies, based on the second image, a corrected region of the first image which is to be corrected, converts the second image to an image of the first wavelength by using the ratio between the two reflectance distributions, and corrects the corrected region of the first image by using the converted image.

5. The apparatus according to claim 3, further comprising a storage unit storing information of the two reflectance distributions.

6. The apparatus according to claim 5, wherein the information of the two reflectance distributions stored in the storage unit comprises information obtained in advance by an apparatus different from the measurement apparatus.

7. The apparatus according to claim 3, further comprising a third illumination unit configured to illuminate, with light having the first wavelength, the illumination region illuminated with the second light,
   wherein the processor obtains the second image by causing the image sensing unit to sense an image of the surface while illuminating the surface by using the second illumination unit, obtains a third image different from the first image of the surface by causing the image sensing unit to sense an image of the surface while illuminating the surface by using the third illumination unit, and obtains pieces of information of the two reflectance distributions, respectively, from the obtained second image and the obtained third image.

8. The apparatus according to claim 3, wherein the first illumination unit comprises a light source configured to emit light having the first wavelength, a generation unit configured to generate the first light having the pattern shape from light emitted from the light source, and a switching mechanism configured to switch the generation unit between a position on an optical path and a position outside the optical path, and
   wherein the processor obtains the second image by causing the image sensing unit to sense an image of the surface while illuminating the surface by using the second illumination unit, causes the generation unit to obtain a third image different from the first image of the surface by causing the image sensing unit to sense an image of the surface while illuminating the surface by using the first illumination unit located outside the optical path, and obtains pieces of information of the two reflectance distributions, respectively, from the obtained second image and the obtained third image.

9. The apparatus according to claim 4, wherein the processor specifies the corrected region by comparing information of a region having a specific reflectance with the second image.

10. The apparatus according to claim 9, wherein the information includes information of a shape of the region having the specific reflectance.

11. The apparatus according to claim 9, wherein the information includes information about a size of the region having the specific reflectance.

12. The apparatus according to claim 9, wherein the region having the specific reflectance includes a print region.

13. The apparatus according to claim 4, wherein the processor specifies the corrected region based on summary information of a position and a posture of the surface.

14. The apparatus according to claim 1, wherein the processor obtains information of a two-dimensional shape of the surface based on the second image.

15. A method of measuring a shape of a surface to be measured, the method comprising:
    illuminating the surface with first light having a first wavelength having a light intensity distribution in a pattern shape while illuminating, with second light having a second wavelength different from the first wavelength, a region of the surface which is wider than an illumination region illuminated with the first light, and thereby obtaining a first image of the first wavelength and a second image of the second wavelength of the surface;
    correcting the first image based on the second image; and
    obtaining information of the shape of the surface by using the corrected first image.

16. The method according to claim 15, wherein the correcting includes correcting the first image by using the second image and a ratio between two reflectance distributions on the surface with respect to the light having the first wavelength and the light having the second wavelength.

17. The method according to claim 16, wherein the correcting includes specifying, based on the second image, a corrected region of the first image which is to be corrected, converting the second image into the image of the first wavelength by using a ratio between the two reflectance distributions, and correcting the corrected region of the first image by using the converted image.

18. The method according to claim 15, further comprising obtaining information of a two-dimensional shape of the surface based on the second image.

19. The apparatus according to claim 1, wherein the second illumination unit includes a first light emitting part and a second light emitting part arranged on both sides of the image sensing unit.

20. The apparatus according to claim 1, wherein the image sensing unit is configured to separate light of the first wavelength and light of the second wavelength to obtain the first image and the second image.

21. A measurement apparatus that obtains information of a shape of a surface to be measured, the apparatus comprising:
- a first illumination unit configured to illuminate the surface with first light having a first wavelength having a light intensity distribution in a pattern shape;
- a second illumination unit configured to illuminate, with second light having a second wavelength different from the first wavelength, a region of the surface;
- an image sensing unit configured to sense an image of the surface; and
- a processor configured to obtain information of the shape of the surface by processing the image of the surface output from the image sensing unit,
- wherein the image sensing unit is configured to simultaneously sense a first image by using the first illumination unit and a second image by using the second illumination unit.

* * * * *